US012619520B2

(12) United States Patent
Dey et al.

(10) Patent No.: US 12,619,520 B2
(45) Date of Patent: May 5, 2026

(54) SOFTWARE ENGINEERING WITH MACHINE-READABLE FEATURE SPECIFICATIONS

(71) Applicant: ServiceNow, Inc., Santa Clara, CA (US)

(72) Inventors: Avishek Dey, Hyderabad (IN); Aakanchha Trivedi, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 230 days.

(21) Appl. No.: 18/303,837

(22) Filed: Apr. 20, 2023

(65) Prior Publication Data

US 2024/0354234 A1    Oct. 24, 2024

(51) Int. Cl.
G06F 11/3668    (2025.01)

(52) U.S. Cl.
CPC ...... G06F 11/3684 (2013.01); G06F 11/3688 (2013.01)

(58) Field of Classification Search
CPC .......................... G06F 11/3684; G06F 11/3688
See application file for complete search history.

(56) References Cited

U.S. PATENT DOCUMENTS

| | | |
|---|---|---|
| 4,941,084 A | 7/1990 | Terada |
| 5,185,860 A | 2/1993 | Wu |
| 5,237,518 A | 8/1993 | Sztipanovits |
| 5,261,097 A | 11/1993 | Saxon |
| 5,265,252 A | 11/1993 | Rawson, III |
| 5,367,685 A | 11/1994 | Gosling |
| 5,390,297 A | 2/1995 | Barber |
| 5,442,791 A | 8/1995 | Wrabetz |
| 5,452,415 A | 9/1995 | Hotka |
| 5,522,042 A | 5/1996 | Fee |
| 5,533,116 A | 7/1996 | Vesterinen |
| 5,655,081 A | 8/1997 | Bonnell |
| 5,659,736 A | 8/1997 | Hasegawa |
| 5,671,412 A | 9/1997 | Christiano |
| 5,696,701 A | 12/1997 | Burgess |

(Continued)

FOREIGN PATENT DOCUMENTS

| | | |
|---|---|---|
| EP | 0433979 A2 | 6/1991 |
| EP | 1607824 A2 | 12/2005 |

(Continued)

OTHER PUBLICATIONS

Wang et al; Automatic Generation of System Test Cases from Use Case Specifications, 12 pages (Year: 2015).*
ServiceNow, Utah IT Service Management, Apr. 20, 2023.

*Primary Examiner* — Wei Y Mui
*Assistant Examiner* — Brahim Bourzik
(74) *Attorney, Agent, or Firm* — McDonnell Boehnen Hulbert & Berghoff LLP

(57) ABSTRACT

Systems and methods are provided for assisted software feature (or "requirement") generation and for the automated or semi-automated generation of test cases therefrom. Also included are improved systems and methods for associating test cases with requirements and for modifying the test cases as the requirements are modified, added, and/or removed. These embodiments allow the cost of generating and maintaining a set of requirements and test cases and the cost of validating such a set of test cases to be reduced.

18 Claims, 11 Drawing Sheets

(56)                    References Cited

U.S. PATENT DOCUMENTS

| | | | |
|---|---|---|---|
| 5,715,463 A | 2/1998 | Merkin | |
| 5,745,879 A | 4/1998 | Wyman | |
| 5,761,502 A | 6/1998 | Jacobs | |
| 5,764,913 A | 6/1998 | Jancke | |
| 5,887,139 A | 3/1999 | Madison, Jr. | |
| 5,909,217 A | 6/1999 | Bereiter | |
| 5,937,165 A | 8/1999 | Schwaller | |
| 5,949,976 A | 9/1999 | Chappelle | |
| 5,978,594 A | 11/1999 | Bonnell | |
| 6,021,437 A | 2/2000 | Chen | |
| 6,041,347 A | 3/2000 | Harsham | |
| 6,088,717 A | 7/2000 | Reed | |
| 6,101,500 A | 8/2000 | Lau | |
| 6,128,016 A | 10/2000 | Coelho | |
| 6,131,118 A | 10/2000 | Stupek, Jr. | |
| 6,134,581 A | 10/2000 | Ismael | |
| 6,138,122 A | 10/2000 | Smith | |
| 6,148,335 A | 11/2000 | Haggard | |
| 6,166,732 A | 12/2000 | Mitchell | |
| 6,167,448 A | 12/2000 | Hemphill | |
| 6,175,866 B1 | 1/2001 | Holloway | |
| 6,175,878 B1 | 1/2001 | Seaman | |
| 6,260,050 B1 | 7/2001 | Yost | |
| 6,263,457 B1 | 7/2001 | Anderson | |
| 6,272,150 B1 | 8/2001 | Hrastar | |
| 6,336,138 B1 | 1/2002 | Caswell | |
| 6,363,421 B2 | 3/2002 | Barker | |
| 6,393,386 B1 | 5/2002 | Zager | |
| 6,397,245 B1 | 5/2002 | Johnson, II | |
| 6,434,626 B1 | 8/2002 | Prakash | |
| 6,438,592 B1 | 8/2002 | Killian | |
| 6,456,306 B1 | 9/2002 | Chin | |
| 6,466,932 B1 | 10/2002 | Dennis | |
| 6,487,590 B1 | 11/2002 | Foley | |
| 6,505,248 B1 | 1/2003 | Casper | |
| 6,526,442 B1 | 2/2003 | Stupek, Jr. | |
| 6,621,823 B1 | 9/2003 | Mellquist | |
| 6,707,795 B1 | 3/2004 | Noorhosseini | |
| 6,742,015 B1 | 5/2004 | Bowman-Amuah | |
| 6,763,380 B1 | 7/2004 | Mayton | |
| 6,816,898 B1 | 11/2004 | Scarpelli | |
| 6,895,586 B1 | 5/2005 | Brasher | |
| 6,948,175 B1 | 9/2005 | Fong | |
| 6,985,901 B1 | 1/2006 | Sachse | |
| 7,003,564 B2 | 2/2006 | Greuel | |
| 7,028,228 B1 | 4/2006 | Lovy | |
| 7,043,537 B1 | 5/2006 | Pratt | |
| 7,043,661 B2 | 5/2006 | Valadarsky | |
| 7,062,683 B2 | 6/2006 | Warpenburg | |
| 7,096,459 B2 | 8/2006 | Keller | |
| 7,146,574 B2 | 12/2006 | Goldthwaite | |
| 7,197,466 B1 | 3/2007 | Peterson | |
| 7,215,360 B2 | 5/2007 | Gupta | |
| 7,216,304 B1 | 5/2007 | Gourdol | |
| 7,222,147 B1 | 5/2007 | Black | |
| 7,281,170 B2 | 10/2007 | Taylor | |
| 7,412,502 B2 | 8/2008 | Fearn | |
| 7,505,872 B2 | 3/2009 | Keller | |
| 7,593,013 B2 | 9/2009 | Agutter | |
| 7,596,716 B2 | 9/2009 | Frost | |
| 7,617,073 B2 | 11/2009 | Trinon | |
| 7,660,731 B2 | 2/2010 | Chaddha | |
| 7,676,294 B2 | 3/2010 | Baier | |
| 7,676,437 B2 | 3/2010 | Satkunanathan | |
| 7,840,490 B1 | 11/2010 | Sellers | |
| 7,877,783 B1 | 1/2011 | Cline | |
| 7,890,869 B1 | 2/2011 | Mayer | |
| 7,966,398 B2 | 6/2011 | Wiles, Jr. | |
| 8,060,396 B1 | 11/2011 | Bessler | |
| 8,196,210 B2 | 6/2012 | Sterin | |
| 8,321,948 B2 | 11/2012 | Robinson | |
| 8,407,669 B2 | 3/2013 | Yee | |
| 8,554,750 B2 | 10/2013 | Rangarajan | |
| 8,595,647 B2 | 11/2013 | Sabin | |
| 8,620,818 B2 | 12/2013 | Hughes | |
| 8,646,093 B2 | 2/2014 | Myers | |
| 8,674,992 B2 | 3/2014 | Poston | |
| 8,725,647 B2 | 5/2014 | Disciascio | |
| 9,053,460 B2 | 6/2015 | Gilbert | |
| 10,176,085 B2 * | 1/2019 | Zare | G06F 11/3684 |
| 10,673,963 B1 | 6/2020 | Feiguine | |
| 10,749,943 B1 | 8/2020 | Feiguine | |
| 10,771,344 B2 | 9/2020 | Bitterfeld | |
| 10,824,650 B2 | 11/2020 | Bar Oz | |
| 10,944,654 B2 | 3/2021 | Rimar | |
| 10,999,152 B1 | 5/2021 | Bar Oz | |
| 11,025,481 B1 | 6/2021 | Louca | |
| 11,089,115 B2 | 8/2021 | Garty | |
| 11,095,506 B1 | 8/2021 | Erblat | |
| 11,275,580 B2 | 3/2022 | Tamir | |
| 11,277,475 B2 | 3/2022 | Tal | |
| 11,281,442 B1 | 3/2022 | Tal | |
| 11,296,922 B2 | 4/2022 | Leibkowiz | |
| 11,301,503 B2 | 4/2022 | Burli | |
| 11,379,089 B2 | 7/2022 | Goswami | |
| 11,451,573 B2 | 9/2022 | Waplington | |
| 11,470,107 B2 | 10/2022 | Waplington | |
| 2002/0116340 A1 | 8/2002 | Hellberg | |
| 2002/0133584 A1 | 9/2002 | Greuel | |
| 2002/0158969 A1 | 10/2002 | Gupta | |
| 2003/0118087 A1 | 6/2003 | Goldthwaite | |
| 2003/0200293 A1 | 10/2003 | Fearn | |
| 2005/0015217 A1 | 1/2005 | Weidl | |
| 2005/0091356 A1 | 4/2005 | Izzo | |
| 2006/0026453 A1 | 2/2006 | Frost | |
| 2006/0095461 A1 | 5/2006 | Raymond | |
| 2006/0179058 A1 | 8/2006 | Bram | |
| 2006/0293942 A1 | 12/2006 | Chaddha | |
| 2007/0033279 A1 | 2/2007 | Battat | |
| 2007/0188494 A1 | 8/2007 | Agutter | |
| 2007/0288389 A1 | 12/2007 | Vaughan | |
| 2008/0133289 A1 | 6/2008 | Armour | |
| 2008/0148253 A1 | 6/2008 | Badwe | |
| 2008/0319779 A1 | 12/2008 | Hughes | |
| 2009/0088875 A1 | 4/2009 | Baier | |
| 2009/0228984 A1 | 9/2009 | Sterin | |
| 2010/0110932 A1 | 5/2010 | Doran | |
| 2012/0131547 A1 * | 5/2012 | Muir | G06F 11/3698 717/109 |
| 2016/0179659 A1 * | 6/2016 | Champlin-Scharff | G06F 11/3684 717/126 |
| 2018/0011780 A1 * | 1/2018 | Aggarwal | G06F 11/36 |
| 2018/0123940 A1 | 5/2018 | Rimar | |
| 2019/0073257 A1 | 3/2019 | Dasgupta | |
| 2019/0104398 A1 | 4/2019 | Owen | |
| 2019/0155572 A1 * | 5/2019 | Misra | G06F 11/263 |
| 2020/0019492 A1 * | 1/2020 | Fei | G06N 7/01 |
| 2020/0050689 A1 | 2/2020 | Tal | |
| 2020/0204443 A1 | 6/2020 | Bar Oz | |
| 2020/0301678 A1 | 9/2020 | Burman | |
| 2021/0194764 A1 | 6/2021 | Badyan | |
| 2022/0029886 A1 | 1/2022 | Hameiri | |
| 2022/0156157 A1 * | 5/2022 | Weaver | G06F 11/1469 |
| 2023/0308381 A1 * | 9/2023 | Tahvili | G06F 11/3684 |

FOREIGN PATENT DOCUMENTS

| | | | |
|---|---|---|---|
| WO | 9934285 W | 7/1999 | |
| WO | 0052559 W | 9/2000 | |
| WO | 0179970 W | 10/2001 | |

* cited by examiner

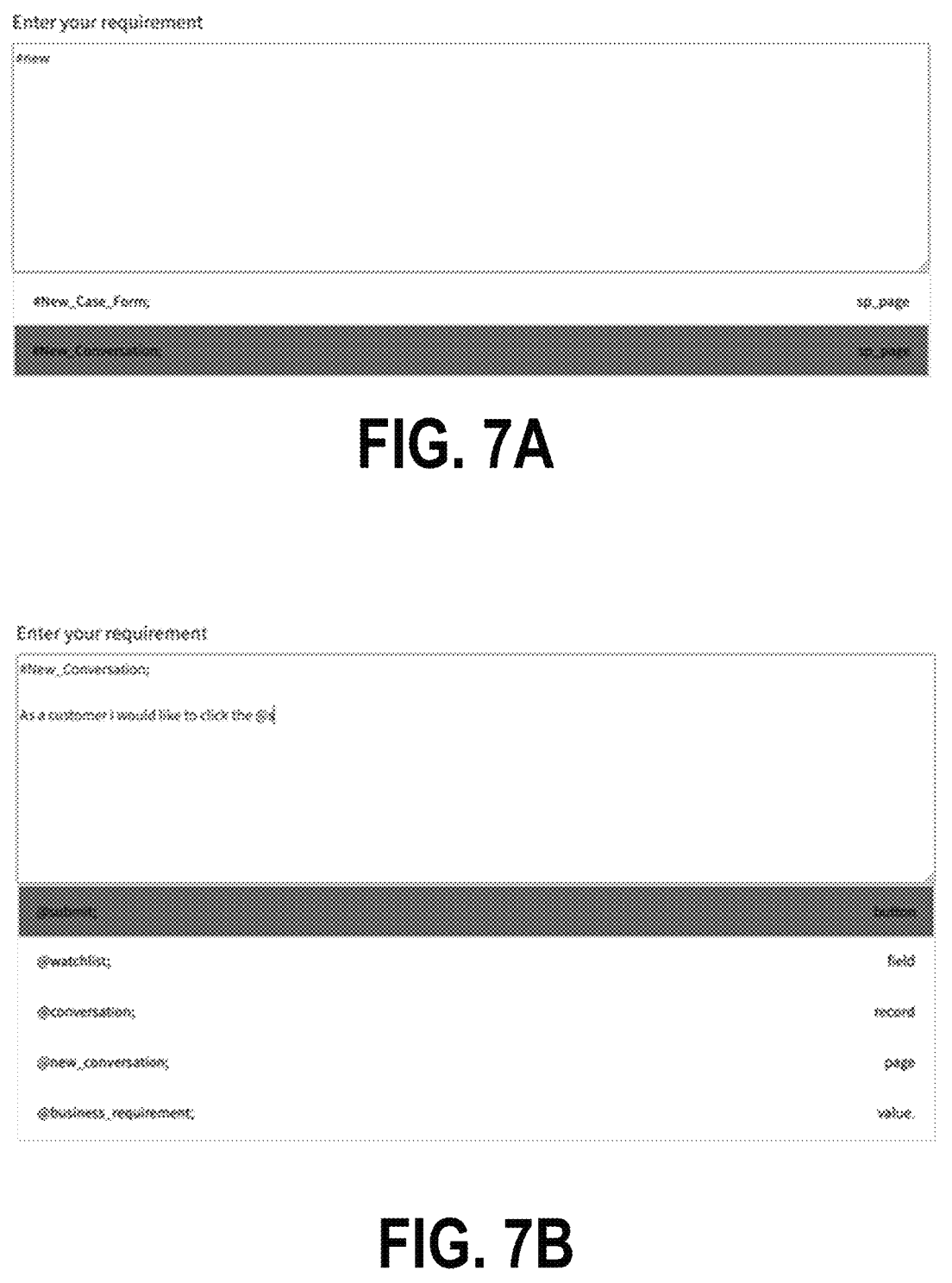

Enter your requirement

Show

New_Case_Form;

sp_page

New Conversation record

FIG. 7A

Enter your requirement

New_Conversation;

As a customer i would like to click the # position feature

@watchlist;

field

@conversation;

record

@new_conversation;

page

@business_requirement;

value

FIG. 7B

On the #home_page; as a customer, I would like to click on the @create_conversation; button to open the @new_conversation; page;

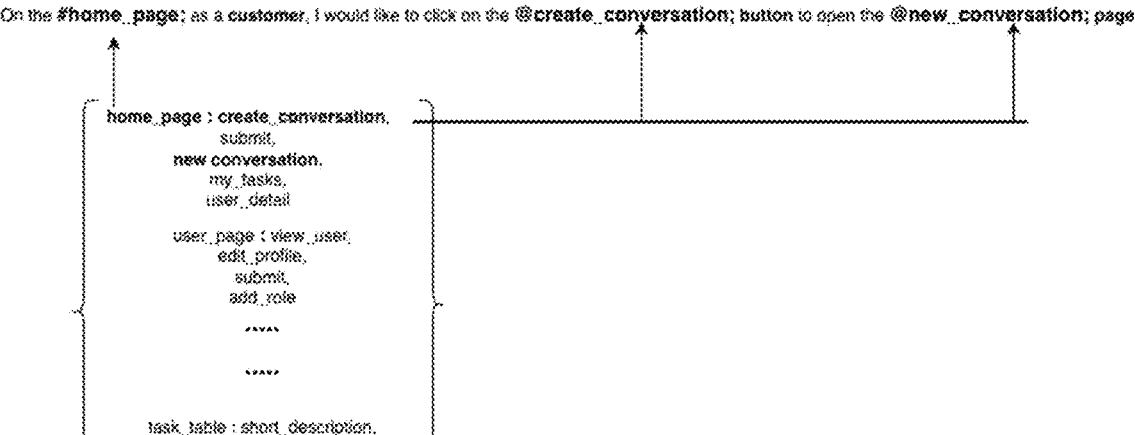

home_page : create_conversation,
submit,
new conversation,
my_tasks,
user_detail user_page : view_user,
edit_profile,
submit,
add_role

. . . . .

. . . . .

task_table : short_description,
assigned_user,
create,
add_task

FIG. 7C

On the #home_page; as a customer, I would like to click on the @create_conversation; button to open the @new_conversation; page;

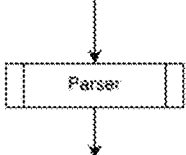

Parser

Context = #home_page; Actors = customer,
I would like to click on the @create_conversation; button to open the @new_conversation; page;

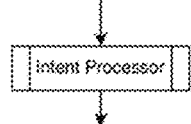

Intent Processor

Context = #home_page;
Actors = customer,
Action = click the create_conversation button
Result = open the new_conversation page;

FIG. 8

Context = #home_page;
Actors = customer,
Action = <u>click</u> the create_conversation <u>button</u>
Result = <u>open</u> the new_conversation page;

Test Case #0,
Steps:
1. Open home_page as a customer
2. Click on the create_conversation button
3. Should <u>open</u> the new_conversation page

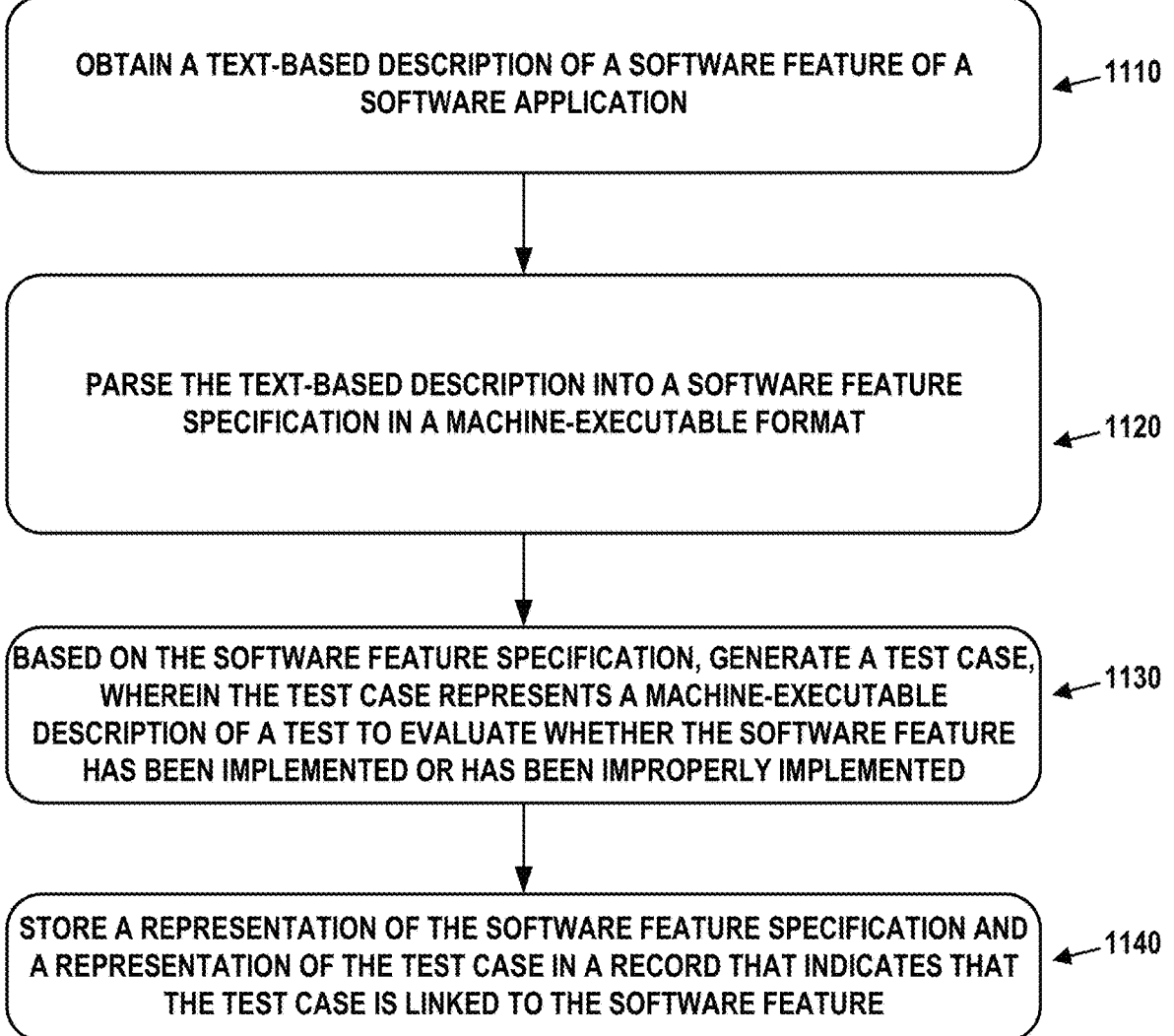

OBTAIN A TEXT-BASED DESCRIPTION OF A SOFTWARE FEATURE OF A SOFTWARE APPLICATION ←1110

PARSE THE TEXT-BASED DESCRIPTION INTO A SOFTWARE FEATURE SPECIFICATION IN A MACHINE-EXECUTABLE FORMAT ←1120

BASED ON THE SOFTWARE FEATURE SPECIFICATION, GENERATE A TEST CASE, WHEREIN THE TEST CASE REPRESENTS A MACHINE-EXECUTABLE DESCRIPTION OF A TEST TO EVALUATE WHETHER THE SOFTWARE FEATURE HAS BEEN IMPLEMENTED OR HAS BEEN IMPROPERLY IMPLEMENTED ←1130

STORE A REPRESENTATION OF THE SOFTWARE FEATURE SPECIFICATION AND A REPRESENTATION OF THE TEST CASE IN A RECORD THAT INDICATES THAT THE TEST CASE IS LINKED TO THE SOFTWARE FEATURE ←1140

FIG. 11

SOFTWARE ENGINEERING WITH MACHINE-READABLE FEATURE SPECIFICATIONS

BACKGROUND

The process of software development can be organized by representing features of the software to be implemented as "requirements." From each requirement, one or more tests may be created, which can be evaluated (e.g., by a quality control professional, or via an automated process) to determine whether the requirement has been fully and accurately implemented. As software development continues, the set of requirements, and their associated tests, may expand and may also be modified or removed (e.g., as requirements are changed or deprecated). This can lead to increased storage requirements as the set of requirements and tests expands, as well as increased computation requirements to perform analyses or other tasks on the set of requirements and tests. Further, validation of the tests increases in cost (computational cost for those validated by computer execution, human effort and time for those validated by human quality control professionals) as the number of tests increases.

SUMMARY

During software development (or the development of some other product, service, or system), the set of requirements can expand and be modified. Correspondingly, the set of test cases used by quality control or other individuals or systems to evaluate whether those requirements have been fully and accurately implemented may also expand significantly. Embodiments described herein reduce the amount of human effort and the computational cost (e.g., storage, cycles) needed to generate and organize representations of the requirements and of their associated test cases and to modify such requirements and test cases. This is accomplished, in part, by parsing human-generated narratives that describe a new (or updated) requirement into a machine-readable format. Such a machine-readable software feature specification can then be used to generate one or more test cases for the underlying requirement, and/or to update such test cases in response to modifications to their corresponding requirement(s). Human input may be used to approve such automatically-generated test cases and/or to modify such test cases.

Additionally, embodiments described herein can reduce the cost to maintain (e.g., to store, to update) and validate (e.g., via automated test case validation) test cases for a set of software feature specifications by linking the test cases to their associated software feature specifications. Such linking can allow the test cases to be automatically updated as the underlying requirements (via the associated software feature specification) are modified and/or to delete or otherwise deprecate test cases, in an automated manner, as the underlying requirements are deprecated or otherwise removed from the set of requirements. Embodiments provided herein also allow the total number of test cases to be reduced by linking individual test cases to multiple software feature specifications (e.g., where the operations to validate two or more software feature specifications are sufficiently similar to be described by a single test case).

Such embodiments, in linking test cases to corresponding software feature specifications, can reduce the total number of test cases. Such embodiments can also reduce the total number of software feature specifications, e.g., by deprecating older software feature specifications when newly-added software feature specifications are sufficiently similar and/or by rejecting newly-added software feature specifications when older software feature specifications are sufficiently similar. Such a reduction in the number of test cases and/or software feature specifications can reduce the memory, interconnect bandwidth, processor cycles, or other computational costs necessary to update and maintain the set of test cases and software feature specifications. Such a reduction can also reduce the cost to validate whether a set of requirements (represented by the set of software feature specifications) has been fully and accurately implemented by reducing the total number of test cases to be evaluated in order to validate the set of requirements. In embodiments where some or all of the test cases are validated automatically (e.g., as opposed to being validated by the efforts of a human quality control professional), such a reduction in the total number of test cases as is provided by the embodiments herein can reduce the total computational cost (e.g., processor cycles, server time) necessary to perform such automated validation.

Accordingly, a first example embodiment may involve a method that includes: (i) obtaining a text-based description of a software feature of a software application; (ii) parsing the text-based description into a software feature specification in a machine-executable format; (iii) based on the software feature specification, generating a test case, wherein the test case represents a machine-executable description of a test to evaluate whether the software feature has been implemented or has been improperly implemented; and (iv) storing a representation of the software feature specification and a representation of the test case in a record that indicates that the test case is linked to the software feature.

A second example embodiment may involve a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7A illustrates a user interface, in accordance with example embodiments.

FIG. 7B illustrates a user interface, in accordance with example embodiments.

FIG. 7C illustrates aspects of an input parsing method, in accordance with example embodiments.

FIG. 8 illustrates aspects of an input parsing method, in accordance with example embodiments.

FIG. 11 is a flow chart, in accordance with example embodiments.

DETAILED DESCRIPTION

Figure 1:
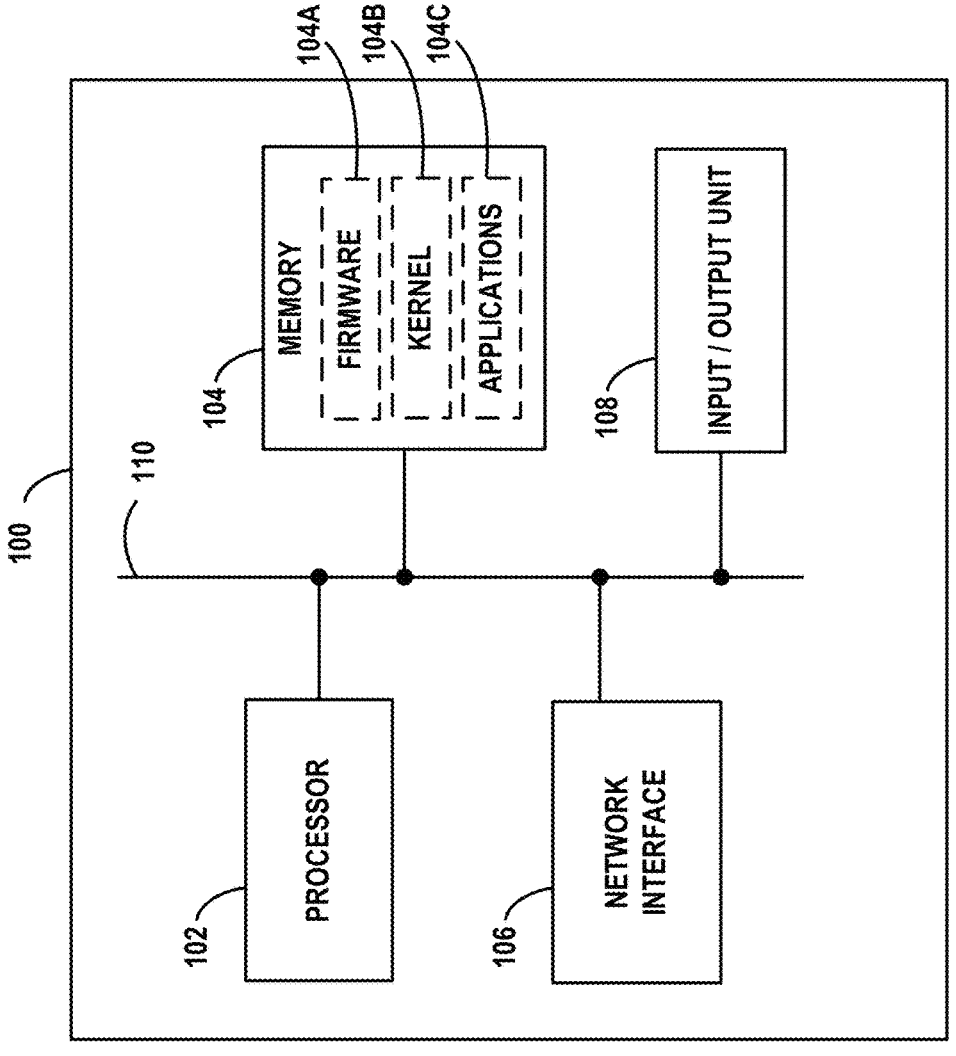
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein. Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security. Nonetheless, the embodiments herein are not limited to enterprise applications or environments, and can be more broadly applied.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure. In some cases, applications structured differently than MVC, such as those using unidirectional data flow, may be employed.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HyperText Markup Language (HTML) and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
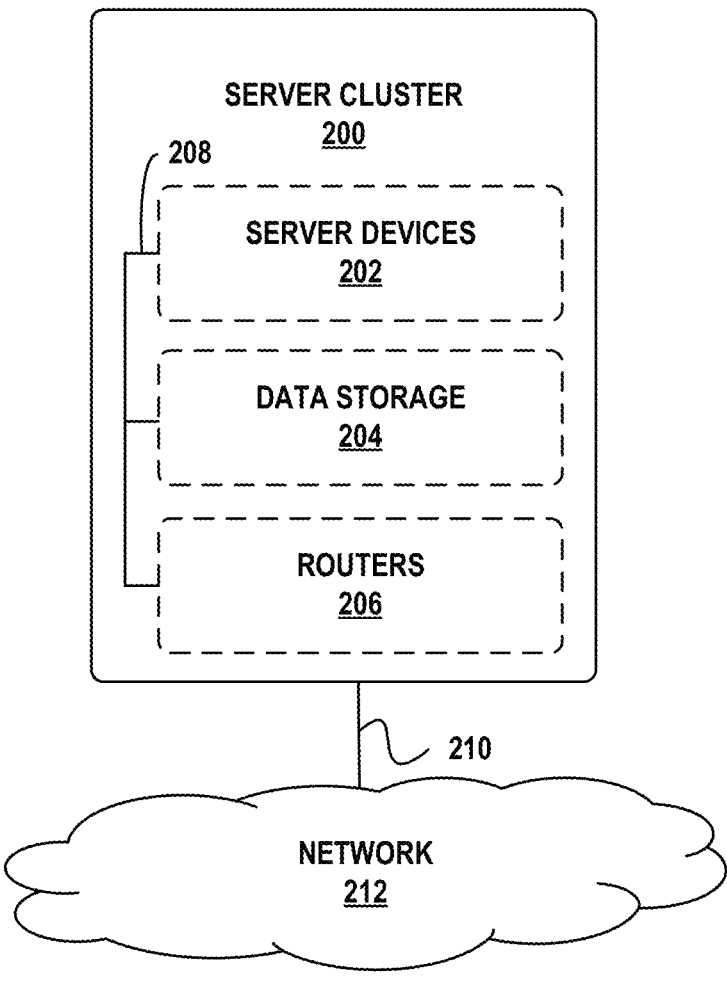
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as HTML, the extensible Markup Language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
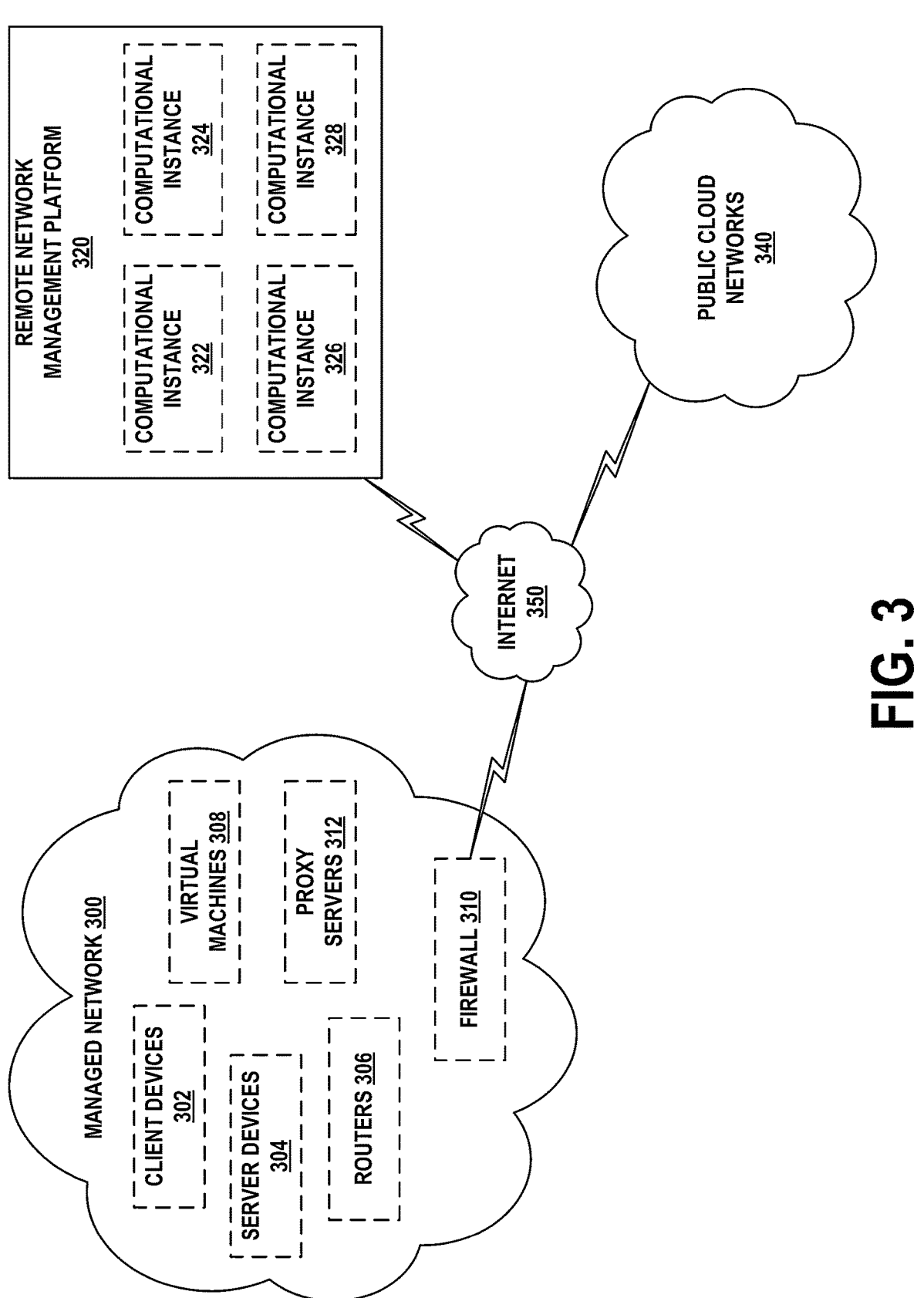
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components.

Possibly with the assistance of proxy servers 312, remote network management platform 320 may also be able to discover and manage aspects of public cloud networks 340 that are used by managed network 300. While not shown in FIG. 3, one or more proxy servers 312 may be placed in any of public cloud networks 340 in order to facilitate this discovery and management.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include Amazon AWS Cloud, Microsoft Azure Cloud (Azure), Google Cloud Platform (GCP), and IBM Cloud Platform. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
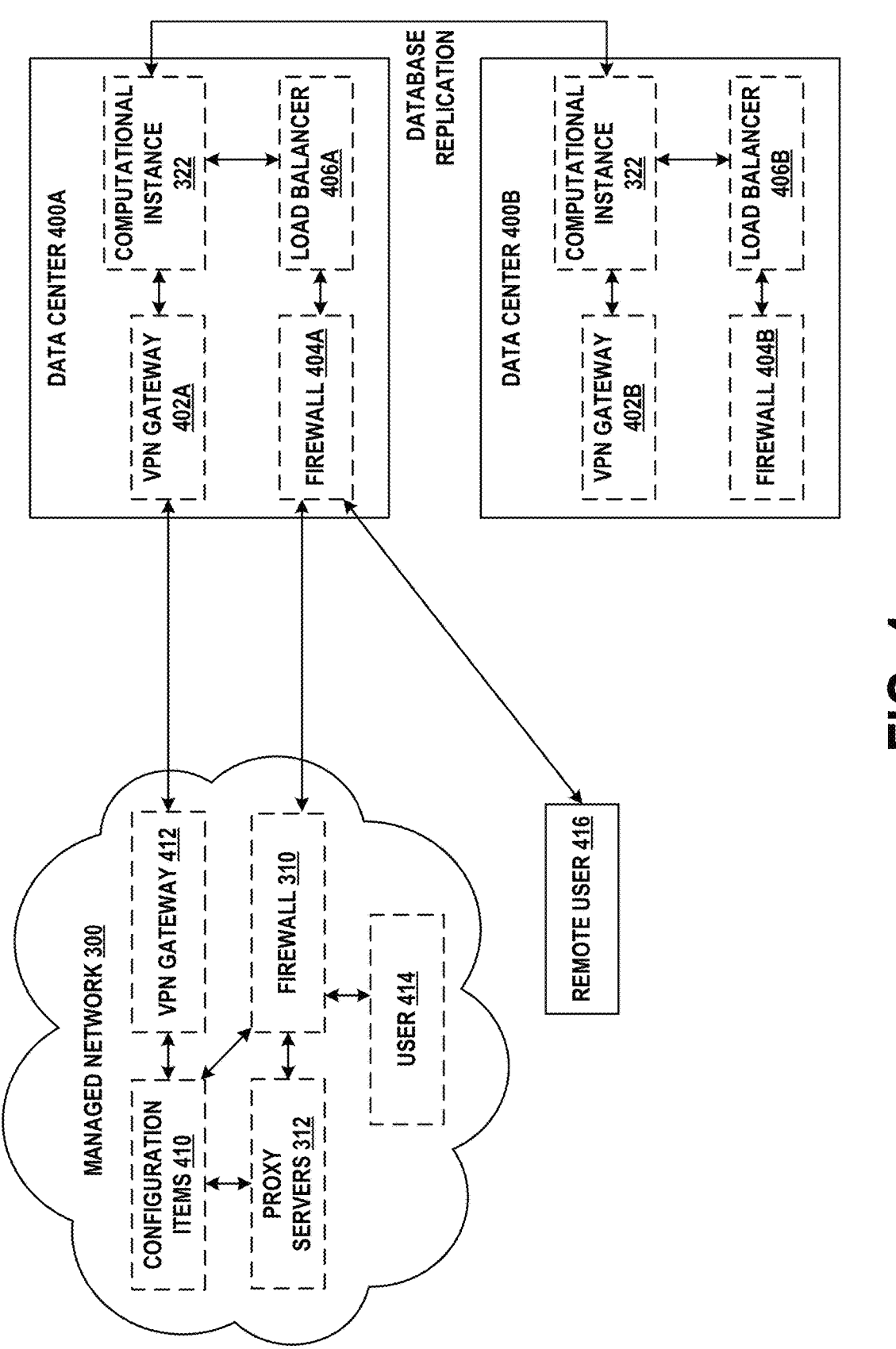
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any components thereof, any applications or services executing thereon, as well as relationships between devices, components, applications, and services. Thus, the term "configuration items" may be shorthand for part of all of any physical or virtual device, or any application or service remotely discoverable or managed by computational instance 322, or relationships between discovered devices, applications, and services. Configuration items may be represented in a configuration management database (CMDB) of computational instance 322.

As stored or transmitted, a configuration item may be a list of attributes that characterize the hardware or software that the configuration item represents. These attributes may include manufacturer, vendor, location, owner, unique identifier, description, network address, operational status, serial number, time of last update, and so on. The class of a configuration item may determine which subset of attributes are present for the configuration item (e.g., software and hardware configuration items may have different lists of attributes).

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively). In various alternatives, devices in managed network 300, such as proxy servers 312, may use a secure protocol (e.g., TLS) to communicate directly with one or more data centers.

IV. Example Discovery

In order for remote network management platform 320 to administer the devices, applications, and services of managed network 300, remote network management platform 320 may first determine what devices are present in managed network 300, the configurations, constituent components, and operational statuses of these devices, and the applications and services provided by the devices. Remote network management platform 320 may also determine the relationships between discovered devices, their components, applications, and services. Representations of each device, component, application, and service may be referred to as a configuration item. The process of determining the configuration items and relationships within managed network 300 is referred to as discovery, and may be facilitated at least in part by proxy servers 312. Representations of configuration items and relationships are stored in a CMDB.

While this section describes discovery conducted on managed network 300, the same or similar discovery procedures may be used on public cloud networks 340. Thus, in some environments, "discovery" may refer to discovering configuration items and relationships on a managed network and/or one or more public cloud networks.

For purposes of the embodiments herein, an "application" may refer to one or more processes, threads, programs, client software modules, server software modules, or any other software that executes on a device or group of devices. A "service" may refer to a high-level capability provided by one or more applications executing on one or more devices working in conjunction with one another. For example, a web service may involve multiple web application server threads executing on one device and accessing information from a database application that executes on another device.

Figure 5:
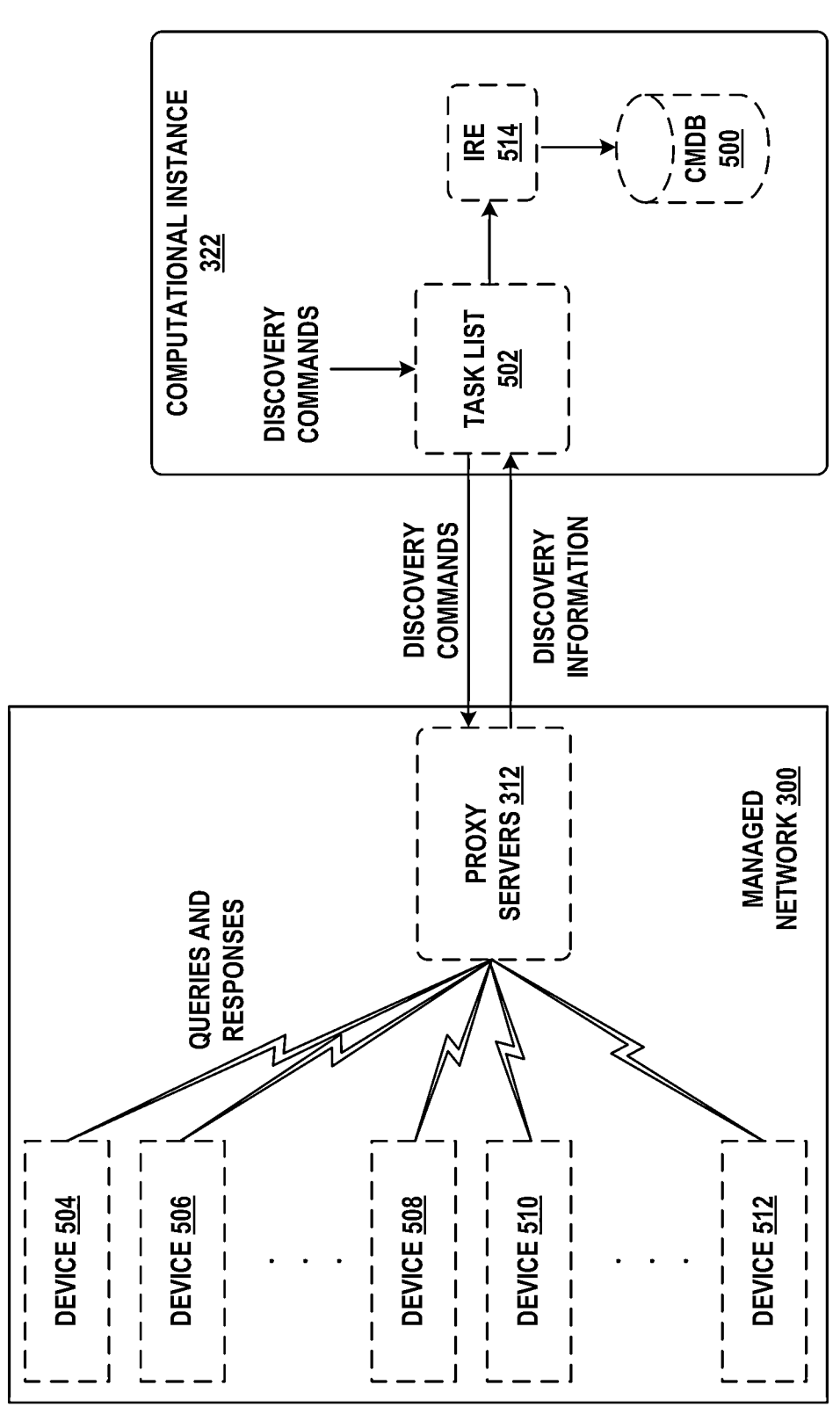
FIG. 5 depicts another communication environment involving a remote network management architecture, in accordance with example embodiments.

FIG. 5 provides a logical depiction of how configuration items and relationships can be discovered, as well as how information related thereto can be stored. For sake of simplicity, remote network management platform 320, public cloud networks 340, and Internet 350 are not shown.

In FIG. 5, CMDB 500, task list 502, and identification and reconciliation engine (IRE) 514 are disposed and/or operate within computational instance 322. Task list 502 represents a connection point between computational instance 322 and proxy servers 312. Task list 502 may be referred to as a queue, or more particularly as an external communication channel (ECC) queue. Task list 502 may represent not only the queue itself but any associated processing, such as adding, removing, and/or manipulating information in the queue.

As discovery takes place, computational instance 322 may store discovery tasks (jobs) that proxy servers 312 are to perform in task list 502, until proxy servers 312 request these tasks in batches of one or more. Placing the tasks in task list 502 may trigger or otherwise cause proxy servers 312 to begin their discovery operations. For example, proxy servers 312 may poll task list 502 periodically or from time to time, or may be notified of discovery commands in task list 502 in some other fashion. Alternatively or additionally, discovery may be manually triggered or automatically triggered based on triggering events (e.g., discovery may automatically begin once per day at a particular time).

Regardless, computational instance 322 may transmit these discovery commands to proxy servers 312 upon request. For example, proxy servers 312 may repeatedly query task list 502, obtain the next task therein, and perform this task until task list 502 is empty or another stopping condition has been reached. In response to receiving a discovery command, proxy servers 312 may query various devices, components, applications, and/or services in managed network 300 (represented for sake of simplicity in FIG. 5 by devices 504, 506, 508, 510, and 512). These devices, components, applications, and/or services may provide responses relating to their configuration, operation, and/or status to proxy servers 312. In turn, proxy servers 312 may then provide this discovered information to task list 502 (i.e., task list 502 may have an outgoing queue for holding discovery commands until requested by proxy servers 312 as well as an incoming queue for holding the discovery information until it is read).

IRE 514 may be a software module that removes discovery information from task list 502 and formulates this discovery information into configuration items (e.g., representing devices, components, applications, and/or services discovered on managed network 300) as well as relationships therebetween. Then, IRE 514 may provide these configuration items and relationships to CMDB 500 for storage therein. The operation of IRE 514 is described in more detail below.

In this fashion, configuration items stored in CMDB 500 represent the environment of managed network 300. As an example, these configuration items may represent a set of physical and/or virtual devices (e.g., client devices, server devices, routers, or virtual machines), applications executing thereon (e.g., web servers, email servers, databases, or storage arrays), as well as services that involve multiple individual configuration items. Relationships may be pairwise definitions of arrangements or dependencies between configuration items.

In order for discovery to take place in the manner described above, proxy servers 312, CMDB 500, and/or one or more credential stores may be configured with credentials for the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

There are two general types of discovery-horizontal and vertical (top-down). Each are discussed below.

A. Horizontal Discovery

Horizontal discovery is used to scan managed network 300, find devices, components, and/or applications, and then populate CMDB 500 with configuration items representing these devices, components, and/or applications. Horizontal discovery also creates relationships between the configuration items. For instance, this could be a "runs on" relationship between a configuration item representing a software application and a configuration item representing a server device on which it executes. Typically, horizontal discovery is not aware of services and does not create relationships between configuration items based on the services in which they operate.

There are two versions of horizontal discovery. One relies on probes and sensors, while the other also employs patterns. Probes and sensors may be scripts (e.g., written in JAVASCRIPT®) that collect and process discovery information on a device and then update CMDB 500 accordingly. More specifically, probes explore or investigate devices on managed network 300, and sensors parse the discovery information returned from the probes.

Patterns are also scripts that collect data on one or more devices, process it, and update the CMDB. Patterns differ from probes and sensors in that they are written in a specific discovery programming language and are used to conduct detailed discovery procedures on specific devices, components, and/or applications that often cannot be reliably discovered (or discovered at all) by more general probes and sensors. Particularly, patterns may specify a series of operations that define how to discover a particular arrangement of devices, components, and/or applications, what credentials to use, and which CMDB tables to populate with configuration items resulting from this discovery.

Both versions may proceed in four logical phases: scanning, classification, identification, and exploration. Also, both versions may require specification of one or more ranges of IP addresses on managed network 300 for which discovery is to take place. Each phase may involve communication between devices on managed network 300 and proxy servers 312, as well as between proxy servers 312 and task list 502. Some phases may involve storing partial or preliminary configuration items in CMDB 500, which may be updated in a later phase.

In the scanning phase, proxy servers 312 may probe each IP address in the specified range(s) of IP addresses for open Transmission Control Protocol (TCP) and/or User Datagram Protocol (UDP) ports to determine the general type of device and its operating system. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist.

In the classification phase, proxy servers 312 may further probe each discovered device to determine the type of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the specific type of operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 10, as a set of WINDOWS®-10-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500 along with any relevant relationships therebetween. Doing so may involve passing the identification information through IRE 514 to avoid generation of duplicate configuration items, for purposes of disambiguation, and/or to determine the table(s) of CMDB 500 in which the discovery information should be written.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (software applications), and so on. Once more, the discovered information may be stored as one or more configuration items in CMDB 500, as well as relationships.

Running horizontal discovery on certain devices, such as switches and routers, may utilize SNMP. Instead of or in addition to determining a list of running processes or other application-related information, discovery may determine additional subnets known to a router and the operational state of the router's network interfaces (e.g., active, inactive, queue length, number of packets dropped, etc.). The IP addresses of the additional subnets may be candidates for further discovery procedures. Thus, horizontal discovery may progress iteratively or recursively.

Patterns are used only during the identification and exploration phases-under pattern-based discovery, the scanning and classification phases operate as they would if probes and sensors are used. After the classification stage completes, a pattern probe is specified as a probe to use during identification. Then, the pattern probe and the pattern that it specifies are launched.

Patterns support a number of features, by way of the discovery programming language, that are not available or difficult to achieve with discovery using probes and sensors. For example, discovery of devices, components, and/or applications in public cloud networks, as well as configuration file tracking, is much simpler to achieve using pattern-based discovery. Further, these patterns are more easily customized by users than probes and sensors. Additionally, patterns are more focused on specific devices, components, and/or applications and therefore may execute faster than the more general approaches used by probes and sensors.

Once horizontal discovery completes, a configuration item representation of each discovered device, component, and/or application is available in CMDB 500. For example, after discovery, operating system version, hardware configuration, and network configuration details for client devices, server devices, and routers in managed network 300, as well as applications executing thereon, may be stored as configuration items. This collected information may be presented to a user in various ways to allow the user to view the hardware composition and operational status of devices.

Furthermore, CMDB 500 may include entries regarding the relationships between configuration items. More specifically, suppose that a server device includes a number of hardware components (e.g., processors, memory, network interfaces, storage, and file systems), and has several software applications installed or executing thereon. Relationships between the components and the server device (e.g., "contained by" relationships) and relationships between the software applications and the server device (e.g., "runs on" relationships) may be represented as such in CMDB 500.

More generally, the relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

In this manner, remote network management platform 320 may discover and inventory the hardware and software deployed on and provided by managed network 300.

B. Vertical Discovery

Vertical discovery is a technique used to find and map configuration items that are part of an overall service, such as a web service. For example, vertical discovery can map a web service by showing the relationships between a web server application, a LINUX® server device, and a database that stores the data for the web service. Typically, horizontal discovery is run first to find configuration items and basic relationships therebetween, and then vertical discovery is run to establish the relationships between configuration items that make up a service.

Patterns can be used to discover certain types of services, as these patterns can be programmed to look for specific arrangements of hardware and software that fit a description of how the service is deployed. Alternatively or additionally, traffic analysis (e.g., examining network traffic between devices) can be used to facilitate vertical discovery. In some cases, the parameters of a service can be manually configured to assist vertical discovery.

In general, vertical discovery seeks to find specific types of relationships between devices, components, and/or applications. Some of these relationships may be inferred from configuration files. For example, the configuration file of a web server application can refer to the IP address and port number of a database on which it relies. Vertical discovery patterns can be programmed to look for such references and infer relationships therefrom. Relationships can also be inferred from traffic between devices—for instance, if there is a large extent of web traffic (e.g., TCP port 80 or 8080) traveling between a load balancer and a device hosting a web server, then the load balancer and the web server may have a relationship.

Relationships found by vertical discovery may take various forms. As an example, an email service may include an email server software configuration item and a database application software configuration item, each installed on different hardware device configuration items. The email service may have a "depends on" relationship with both of these software configuration items, while the software configuration items have a "used by" reciprocal relationship with the email service. Such services might not be able to be fully determined by horizontal discovery procedures, and instead may rely on vertical discovery and possibly some extent of manual configuration.

C. Advantages of Discovery

Regardless of how discovery information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

In another example, suppose that a database application is executing on a server device, and that this database application is used by an employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular hardware device fails.

In general, configuration items and/or relationships between configuration items may be displayed on a web-based interface and represented in a hierarchical fashion. Modifications to such configuration items and/or relationships in the CMDB may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

V. CMDB Identification Rules and Reconciliation

A CMDB, such as CMDB 500, provides a repository of configuration items and relationships. When properly provisioned, it can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information including configuration items and relationships in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API) of IRE 514. Then, IRE 514 may use a set of configurable identification rules to uniquely identify configuration items and determine whether and how they are to be written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to IRE 514, IRE 514 may attempt to match the information with one or more rules. If a match is found, the configuration item is written to the CMDB or updated if it already exists within the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, IRE 514 might only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by IRE 514 or in another fashion. These configuration items may be deleted or flagged for manual de-duplication.

VI. Example Software Feature Specification and Test Case Generation and Management Software development (or the development of some other product, service, or system) can be organized by describing the software using a set of "requirements," each of which may describe one or more features of the software to be implemented. Such requirements may be human-language narrative descriptions of the features. However, such narrative descriptions can be vague, imprecise, or incomplete, making it more difficult to use such narrative requirement descriptions as an input to automated development systems (e.g., to evaluate whether the requirements have been fully and accurately implemented using automated test systems rather than the efforts of human quality control professionals). Indeed, such deficiencies in narrative requirements can also have negative effect when they are later read by other human technicians, or even by the original author at a later time. Embodiments provided herein improve the software development process, in part, by providing user interface elements and parsers to convert user inputs that represent new or updated software feature specifications into a machine-readable form.

Such machine-readable software feature specifications can then be used to generate test cases for the underlying requirements, and/or to update such test cases in response to modifications to their corresponding requirement(s). Human input may be used to approve such automatically-generated test cases and/or to modify such test cases. The test cases can then be used (by human technicians reading and implementing the elements of each test case and/or by an automated system automatically evaluating the test cases) to evaluate whether their corresponding requirements or features (as represented by software feature specifications that represent the requirements or features in the machine-readable format) have been fully and accurately implemented.

The embodiment herein may employ various types of machine learning models, for example to facilitate conversion of user input into machine-readable form and/or to determine similarities between requirements and test cases. These models could be large language models, clustering models, natural language processing models, and so on.

To convert user input into machine-readable code, a large language model (like GPT-3) might perform the following steps: tokenization (breaking the user input text down into individual tokens, which are the basic units of meaning in a sentence), part-of-speech tagging (identifying the part of speech of each token-such as a noun, verb, or adjective-using statistical models and rule-based algorithms), named entity recognition (identifying named entities in the text, such as people, places, organizations, or names of software modules), syntax parsing (analyzing the grammatical structure of the sentence and determining the relationships between the different parts), and code generation (generating machine-readable code that reflects the meaning of the original text, e.g., in a specific programming language or in a format that can be interpreted by a specific application). Overall, the process of converting user input into machine-readable code may involve a combination of statistical modeling, rule-based algorithms, and natural language understanding capabilities.

Determination of similarities between two or more requirements or two or more test cases may involve using supervised or unsupervised learning to project the text of the items into multidimensional vectors. Then, these vectors can be compared. For example, a Euclidian distance (straight-line distance between two points in n-space) or cosine similarity (the cosine of the angle between two vectors in n-space) between these vectors may be calculated. Then, the similarity between the two may be represented as a numeric value in terms of Euclidian distance or in terms of cosine similarity, which can then be compared to a threshold similarity in order to determine whether the two items are sufficiently similar.

Figure 6:
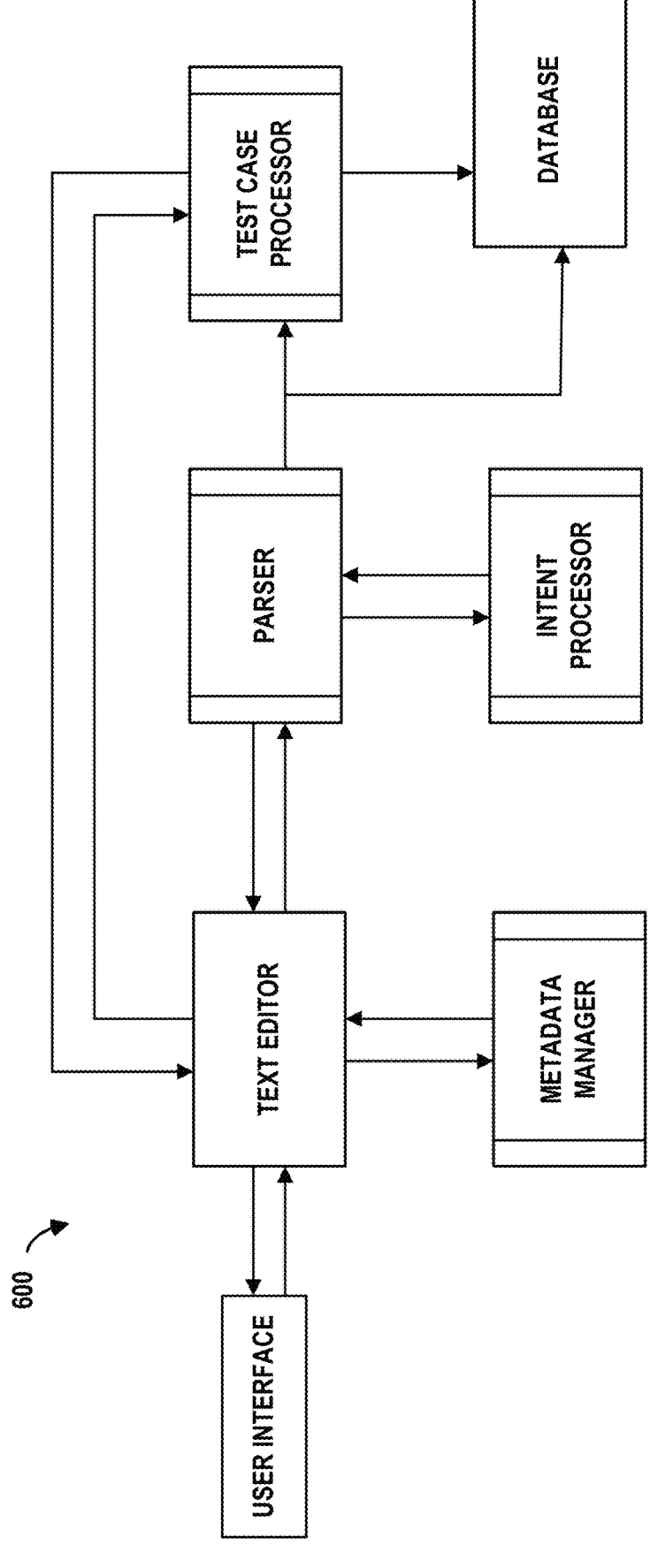
FIG. 6 illustrates a schematic drawing of aspects of a method, in accordance with example embodiments.

FIG. 6 depicts elements of a system as described herein for generating, from user inputs, software feature specifications. The system is also capable of generating, from such machine-readable software feature specifications, test cases and also of updating the software feature specifications and test cases, including updating a record of the relationships between the software feature specifications and the test cases (e.g., to update which software feature specifications are associated with which test cases and/or vice versa). The system could be implemented on a server or other computational substrate (e.g., by a computational instance of a remote network management platform).

The system includes a user interface ("USER INTERFACE") via which a user (e.g., a developer, a quality control professional) can interact with the system. A text editor ("TEXT EDITOR") is provided, via the user interface, to allow the user to input information about requirements, receive information about software feature specifications and/or test cases generated therefrom, provide modifications to generated software feature specifications and/or test cases, approve or decline generated software feature specifications and/or test cases, or provide other inputs and receive other outputs from the system.

User-inputted text is sent to a parser ("PARSER") to convert the input text (which may take the form of a narrative-style description of a new or modified requirement or other feature of software under development) into a machine-readable software feature specification. This can include using an intent processor ("INTENT PROCESSOR") to interpret the input narrative into machine-readable information (e.g., to separate portions of the narrative input into separate actions, to associate actions with entities or object performing the actions or being acted upon, to determine an overall intent for the narrative). The generated software feature specification can then be presented to the user for approval and/or modification (e.g., using the text editor).

An approved software feature specification can then be sent to a test case processor ("TEST CASE PROCESSOR") to generate one or more test cases that describe test(s) to evaluate whether the software feature has been implemented and/or has been improperly implemented. The generated test case(s) can then be presented to the user for approval and/or modification (e.g., using the text editor). Approved test cases and software feature specifications can then be stored in a database ("DATABASE") for later use (e.g., modification, analysis, evaluation of test cases to validate the software under development). Storing test cases and software feature specifications includes storing an indication of the links between software feature specifications and the test cases that can be evaluated to validate them. Such an indication could be present in a record that represents the test case (e.g., a link, ID number or name, or other indication of one or more software feature specifications linked thereto), the software feature specifications (e.g., a link, ID number or name, or other indication of one or more test cases linked thereto), and/or a separate record that indicates the pattern of linkages between test cases and software feature specifications in the database.

User input of narrative information can be assisted by providing context-aware editing feedback. This can include providing drop-downs to complete unfinished words or other inputs (e.g., names of entities, actions, contexts, etc.) as the user types them. The user could then select one of the options in the drop-down (e.g., via tab completion, via clicking in a GUI) to complete the partial input according to the selected option. Information to populate such drop-downs could be provided by consulting a metadata manager ("METADATA MANAGER") that stores information about entities, objects, actions, contexts, or other aspects of the software under development. The information in such a metadata manager could also be expanded based on user inputs received via the text editor. This could be done, e.g., to create new contexts, entities, etc. based on received user inputs that indicate an intent to do so. For example, to create a new page (e.g., a home page, a setting page) or other aspect of a user interface of the software in addition to those already represented in the metadata manager, to create a new user interface element or entity within such a page, etc.

Such context-aware editing feedback can be keyed to the user inputting or otherwise indicating a high-level 'context' for the software feature being added or modified. Such contexts can include different pages or other separate aspects of a user interface (e.g., a home page, a settings page, a user page), different aspects of an analysis (e.g., per-client bandwidth determination and analysis, per-client storage use determination and analysis), different aspects of a database (e.g., different tables of a database), or some other high-level context within an overall software development project whose functionality can be described by one or more requirements or other software features. For example, FIG. 7A depicts an example of the text editor, provided via the user interface, that is displaying a drop-down menu for a user to select between different contexts currently known to the metadata manager. Here, the user has used an escape character indicative of context selection ("#") followed by several characters ("new"). In response to this input the text editor has consulted the metadata manager, determined that there are two existing contexts that begin with "new" ("#New_Case_Form;" and "#New_Conversation;"), and provided an indication to the user that those contexts exist, some information about those contexts (their names and that their type is "sp_page"). The user can then select one of the available contexts (e.g., via tab completion, via clicking), or may input a novel context (which may then be added to the metadata manager).

As the user continues to input a narrative describing the software feature, the text editor can provide drop-down menus for the user to select between different potential entities, objects, actions, or other elements currently known to the metadata manager within the specified context. For example, FIG. 7B depicts an example of the text editor, provided via the user interface, that is displaying a drop-down menu for a user to select between different entities currently known to the metadata manager within the "#New_Conversation;" context. Here, the user has used an escape character indicative of an object ("@") followed by a character ("s"). In response to this input the text editor has consulted the metadata manager, determined that there is only one existing object that begins with "s" ("@submit;"), and provided an indication to the user that that object, in addition to a number of other objects, exist within the current context. Providing objects beyond the scope of the input character(s) could be done in response to the available matching objects numbering less than a threshold number, to compensate for potential typos, to suggest appropriate objects given the prior input, or based on some other consideration. The drop-down includes some information about those objects (their names and their types). The user can then select one of the available objects (e.g., via tab completion, via clicking), or may input a novel object (which may then be added to the current context in the metadata manager).

FIG. 7C illustrates example aspects of how the information in the metadata manager (illustrated by the information within the curly braces in FIG. 7C) can be used to assist a user in inputting a narrative indication of a software feature. The metadata manager has records of a number of contexts ("home_page," "user_page," "task_table") and, for each context, a list of possible objects, entities, actions, or other elements that are relevant to the context (e.g., "create_conversation," "submit," "new-conversation," "my_tasks," and "user_detail" within the "home_page" context). So, based on the user's input indicating that the context is "#home_page;" the text editor later provided "@create_conversation;" and "@new_conversation;" in drop-down menus to the user as they input additional text.

FIG. 8 illustrates an example of how the parser, in combination with the intent processor, generates a machine-readable software feature specification based on a narrative software feature description input by a user. The parser identifies the context and the actor(s) involved in the feature (here, the "home_page" context, with only the actor "customer" performing any actions) and also extracts the remainder of the narrative, which describes the action(s) taken by the actor(s) and the desired result(s) of that action(s). The intent processor receives this intermediate result and determines, based on the action descriptions and within the scope provided by the context and actor(s), one or more actions ("click" the "create_conversation" "button"), and one or more results of the performance of the action(s) ("open" the "new_conversation" "page").

Figure 9:
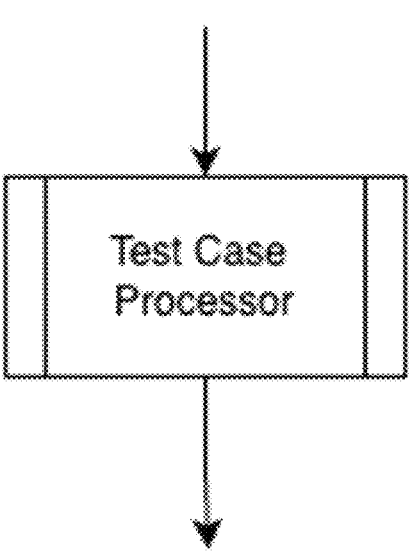
FIG. 9 illustrates aspects of test case generation method, in accordance with example embodiments.

Such a generated software feature specification can then be provided to the user for approval and/or modification. An approved software feature specification can then be used, by the test case processor, to generate one or more test cases. FIG. 9 shows an example of generating a test case from the software feature specification depicted in FIG. 8. In the depicted example, the test case includes a number of steps to 1) enter the specified context, 2) perform the action(s) needed to evaluate whether the software feature specification has been fully and accurately implemented, and 3) evaluate, based on the result(s) of the action(s), whether the software feature specification has been fully and accurately implemented. In the depicted example, each of these elements is represented by a corresponding single step of the test case; however, in practice, multiple steps may represent one or more of these elements. For example, if the underlying requirement also included a requirement that the "new_conversation" page was opened within a specified latency period, using less than a specified amount of computational resources (e.g., memory), using a specific method, or within some other specification, the test cases generated therefrom could include an additional step that the specification be met.

Further, more than one test case may be generated from an input software feature specification. For example, a first test case could evaluate whether the 'positive' effect of the requirement has been implemented (e.g., the opening of the new_conversation page, as in the depicted example). A second test case could also be generated to evaluate whether a 'negative' effect of the requirement has also been implemented (e.g., that clicking on the create_conversation button did not minimize the home page within a user interface).

One issue with management of software development in such a manner (drafting software requirements and test cases associated therewith, and then evaluating the test cases to determine which software requirements have been fully and accurately implemented) is that, over the development life cycle, the number of software requirements and text cases can increase significantly. An increase in either the number of test cases or the number of software requirements (represented, e.g., as machine-readable software requirement specifications) can result in an increase in the storage requirements for storing representations thereof, as well as increases in the computational costs (e.g., processor cycles) needed to search a database of the software requirements and test cases or to perform other analyses or computations thereon (e.g., to analyze the process of software development, to generate reports). Additionally, where some or all of the test cases are evaluated automatically (e.g., by a server or other computational substrate evaluating the test cases and determining whether all of their results are satisfied), an increase in the number of test cases can cause an increase in the computational cost of evaluating all of the test cases.

In many examples, there may be functionally, or even verbatim, duplicate test cases and/or software requirements within a database. This can occur due to a user being unaware that similar requirement(s) are already represented in the database, due to a user failing to adequately search the database for similar entries, due to a failure of a database search function, or some other facto or process. In such examples, it would be beneficial to avoid adding such duplicative feature requirements and/or test cases. The embodiments described herein, which provide parsing of narrative software feature requirements into machine-readable software feature specifications and related test case(s), facilitate the automated comparison of newly added and/or modified requirements and/or test cases generated therefrom to existing software feature specifications and/or test cases in a database.

Where a requirement to be added (or modified) results in a software feature specification that is sufficiently similar to an existing software feature specification, action could be taken to avoid including both of the overly-similar a software feature specifications in the database. This could include prompting the user to further modify the new specification to distinguish it from the prior similar software feature specification, rejecting the new software feature specification, deprecating the old software feature specification (e.g., by deletion from the database, by setting a flag or other indication that the old software feature specification should no longer be used), or taking some other action. The action taken could be performed in response to user input selecting the action from a set of options (e.g., a selection to deprecate an old software feature specification vs. rejecting the new software feature specification).

Similar action could be taken when one or more test cases generated from a new software feature specification are overly-similar to one or more already-existing test cases in a database. Indeed test case similarity could be used, in whole or in part, to determine whether corresponding software feature specifications are similar. In some examples, a new software feature specification (e.g., that is sufficiently dissimilar from prior software feature specification(s)) could be added to a database while being linked to one or more existing test cases that were sufficiently similar to test case(s) generated for the new software feature specification. This could allow the number of total test cases to remain the same or be reduced while still allowing the number of software feature specifications to increase. Accordingly, evaluation of a test case that is linked to two (or more) software feature specifications could be used, partially or completely to determine whether all of the linked software feature specifications have been fully and accurately implemented. The action taken could be performed in response to user input selecting the action from a set of options (e.g., a selection to deprecate an old test case(s) and/or associated software feature specification(s), a selection to reject a new test case(s) and/or associated software feature specification(s), and/or a selection to link a new test case(s) and/or associated software feature specification(s) to an old test case, or vice versa).

The action taken (e.g., to deprecate an old software feature specification and/or test case) could be performed automatically. For example, if a level of similarity between a new software feature specification and any old software feature specification is always less than a threshold similarity level, and a level of similarity between new test case(s) therefore and any old test cases is always less than a threshold similarity level, then both the new a threshold similarity level and the associated test case(s) could be stored in a database, along with indication(s) of the links therebetween, automatically without user approval. Alternatively, where a level of similarity between the new software feature specification and any old software feature specification is greater than a threshold similarity level for at least one old software feature specification and/or a level of similarity between the new test case(s) and any test case is greater than a threshold similarity level for at least one test case, a user interface dialog could be provided to a user to allow them to decide what action to take. Such a dialog could include providing an indication of the new and/or old software feature specification(s) and/or test case(s). Selectable actions could include rejecting the new software feature specification and/or test case(s), deprecating the old software feature specification(s) and/or test case(s), deprecating the old test case(s) and linking the old software feature specification(s) to one or more of the new test case(s), rejecting the new test case(s) and linking the new software feature specification to one or more of the old test case(s), or some other option of combination of options.

The result of such operations is a reduction in the number of software feature specifications and in the number of test cases, as well as a potential reduction in the amount number of test cases that need to be evaluated in order to validate whether one or a set of software features have been fully and accurately implemented. This is due to the linking of test cases to software feature specifications, allowing the effort in evaluating a particular test case to be applied to the validation of all of the software feature specifications linked thereto. This avoids duplication of effort (e.g., duplication of processor cycles, memory use, bandwidth use) to perform effectively or functionally identical test cases for different software feature specifications. These operations also reduce human efforts, both in manually evaluating test cases and in maintaining a database of software feature specifications and test cases. This can be related to the linkages between software feature specifications and test cases allowing modifications to a parent software feature specification to be propagated to the test case(s) linked thereto.

Figure 10A:
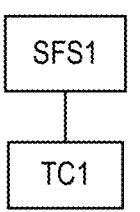
FIG. 10A illustrates aspects of a pattern of relationships between a software feature specification and a test case, in accordance with example embodiments.
Figure 10B:
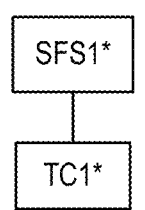
FIG. 10B illustrates aspects of a pattern of relationships between a set of software feature specifications and a set of test cases, in accordance with example embodiments.

FIGS. 10A-H illustrate a variety of examples of how a database of software feature specifications and test cases, along with the patterns of linkages there between, can be developed and updated. FIG. 10A depicts the generation of an initial software feature specification ("SFS1") and a single test case ("TC1") therefrom. When storing SFS1 and TC1, an indication of the linkage of TC1 to SFS1 is also stored (e.g., as part of a database entry for SFS1, as part of a database entry for TC1, as an independent database entry or table indicative of such links, etc.). If SFS1 is modified, then the stored link to TC1 can be used to determine that TC1 should also be modified. This is indicated in FIG. 10B (with "SFS1*" representing the modified SFS1 and "TC1*" representing the modified TC1). Such a linkage also allows the number of test cases to be reduced in the illustrated scenario by allowing TC1 to be modified or deprecated (e.g., in favor of a newly-generated test case from SFS1*) instead of being retained in storage and/or potentially being evaluated in the future.

Figure 10C:
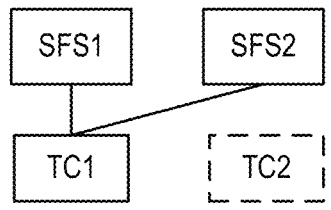
FIG. 10C illustrates aspects of a pattern of relationships between a set of software feature specifications and a set of test cases, in accordance with example embodiments.
Figure 10D:
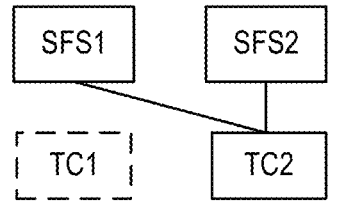
FIG. 10D illustrates aspects of a pattern of relationships between a set of software feature specifications and a set of test cases, in accordance with example embodiments.

FIG. 10C illustrates another scenario, wherein a new software feature specification "SFS2" has been added, and a new test case "TC2" generated therefrom. In this example, the new TC2 is rejected but the new SFS2 retained, being linked to the old TC1. This could be done, e.g., because a similarity between SFS1 and SFS2 was below a threshold similarity while a similarity between TC1 and TC2 was above a threshold similarity, because a user indicated that such an action should be taken, or for some other reason. The link between SFS2 and TC1 means that modification or removal of SFS2 could result in modification of TC1, and also that determining whether SFS2 has been fully and accurately implemented includes evaluation of TC1. Alternatively, TC2 could be retained and TC1 deprecated (e.g., via deletion, setting a flag to indicate that it should not be used), with SFS1 linked to TC2. This scenario is indicated in FIG. 10D. In either scenario, validation that both SFS1 and SFS2 have been fully and accurately implemented requires only evaluation of one test case (TC1 or TC2), rather than two test cases, as would have been the case without the linking of software feature specifications and test cases as described herein.

Figure 10E:
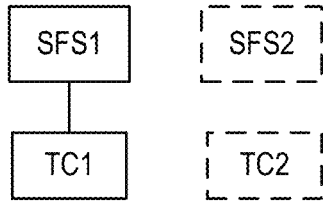
FIG. 10E illustrates aspects of a pattern of relationships between a set of software feature specifications and a set of test cases, in accordance with example embodiments.
Figure 10F:
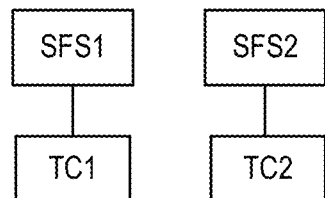
FIG. 10F illustrates aspects of a pattern of relationships between a set of software feature specifications and a set of test cases, in accordance with example embodiments.

In another example, a user could decide that SFS2 is not necessary (e.g., due to representing substantially the same underlying software feature). In such an example, both SFS2 and TC2 could be rejected, with SFS1 and TC1 retained as-is. This is depicted in FIG. 10E. Alternatively, the new SFS2 and TC2 could be selected, and the old SFS1 and TC1 deprecated (e.g., deleted). In yet another example, both of the new software feature specification and test case could be retained, along with the old, and stored in a database (along with an indication of the link therebetween). This scenario is depicted in FIG. 10F. This could be done due to the similarity between the software feature specifications and/or test cases being less than a threshold similarity, due to a user command, or due to some other consideration.

Figure 10G:
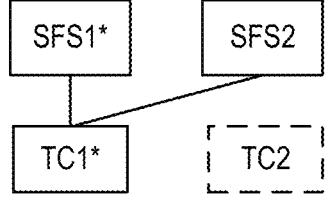
FIG. 10G illustrates aspects of a pattern of relationships between a set of software feature specifications and a set of test cases, in accordance with example embodiments.

A noted above, software feature specifications may be modified (e.g., to represent changes in aspects of the underlying software feature, or in order to represent more distinctive functionality from existing software feature specifications) and such modifications can result in modification of test case(s) linked thereto. The modified test case(s) can then be compared to existing test cases to determine if the modified test case(s) should be deprecated/rejected (with the modified software feature specification linked to existing test case(s)) and/or if existing test case(s) should be deprecated, with the software feature specifications linked thereto now linked to the modified test case. FIG. 10G illustrates an example of such a scenario, wherein a modification to SFS1 (to SFS1*) results in modification of the linked TC1 (to TC1*). It was then determined that TC1* was sufficiently similar to TC2 that TC2 could be deprecated (e.g., deleted) and SFS2 linked to TC1*. Alternatively, TC1* could be rejected, and SFS1* linked to TC2 (not shown).

Figure 10H:
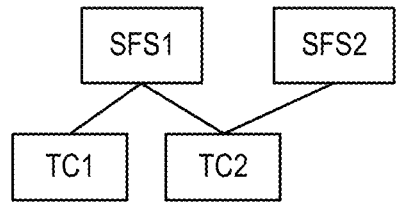
FIG. 10H illustrates aspects of a pattern of relationships between a set of software feature specifications and a set of test cases, in accordance with example embodiments.

Note that the examples of FIGS. 10A-10G, which depict a single test case linked to any software feature specification, are intended as non-limiting example embodiments. A single software feature specification could have linked thereto multiple test cases. In such examples, the pattern of linkages could be more complex. For example, the set of test cases linked to a certain software feature specification could only partially overlap with a set of test cases linked to a second software feature specification. An example of such a scenario is depicted in FIG. 10H, which shows test cases TC1 and TC2 linked to software feature specification SFS1, with TC2 also linked to SFS2. This could occur, e.g., due to TC1 and TC2 being generated for SFS1, and then a determination, upon the generation of SFS2, that TC2 (but not TC1) is a valid test case to evaluate the implementation of SFS2. Indeed, the generation of SFS2 could also include the generation of additional test case(s) (e.g., a "TC3," not shown) that is linked to SFS2 but not SFS1. Other patterns of linkage between software feature specifications and test cases, and scenarios leading to the development of such patterns, are possible.

VII. Example Operations

FIG. 11 is a flow chart illustrating an example embodiment. The process illustrated by FIG. 11 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 11 may be simplified by the removal of any one or more of the features shown therein. Further, these embodiments may be combined with features, aspects, and/or implementations of any of the previous figures or otherwise described herein.

The embodiments of FIG. 11 include obtaining a text-based description of a software feature of a software application (1110). Obtaining the text-based description of the software feature of a software application may include: (i) providing, via a user interface, a textual input field; (ii) receiving, via the textual input field, textual input representative of a first context of an enumerated set of contexts; (iii) receiving, via the textual input field, additional textual input that includes an escape symbol; (iv) responsive to receiving the additional textual input that includes the escape symbol, providing, via the user interface, a menu of object names, wherein each object name in the menu of object names is associated with the first context; (v) receiving, via the user interface, a user selection of one of the object names in the menu; and (vi) responsive to receiving the user selection, adding the object name as selected to the textual input field.

The embodiments of FIG. 11 also include parsing the text-based description into a software feature specification in a machine-executable format (820).

Parsing the text-based description into the software feature specification in the machine-executable format (1120) can include: (i) extracting a context for the software feature from the text-based description; (ii) extracting at least one actor for the software feature from the text-based description; (iii) segmenting the text-based description into two or more text segments; (iv) generating at least one action for the software feature specification based on a corresponding at least one text segment of the two or more text segments, wherein the at least one action includes at least one object selected from an enumerated set of objects that is associated with the context; and (v) generating at least one result for the software feature specification based on a corresponding at least one text segment of the two or more text segments, wherein the at least one result includes at least one object selected from the enumerated set of objects that is associated with the context. In such embodiments, generating the test case based on the software feature specification can include: (i) generating a first task to be performed by the at least one actor to enter the context; (ii) based on the at least one action, generating at least one additional task to be performed by the at least one actor within the context; and (iii) based on the at least one result, generating at least one outcome that can be detected as a result of performance of the at least one additional task.

The embodiments of FIG. 11 additionally include, based on the software feature specification, generating a test case, wherein the test case represents a machine-executable description of a test to evaluate whether the software feature has been implemented or has been improperly implemented (1130).

The embodiments of FIG. 11 also include storing a representation of the software feature specification and a representation of the test case in a record that indicates that the test case is linked to the software feature (1140).

The embodiments of FIG. 11 may additionally include, during testing of the software application, determining that the test case is linked to the software feature; and executing the test case on the software feature as implemented in the software application to determine whether the software feature has been implemented or has been improperly implemented.

The embodiments of FIG. 11 may additionally include: (i) obtaining an update to the text-based description of the software application; (ii) parsing the update to the text-based description of the software application to update the software feature specification; and (iii) based on the updated software feature specification as updated and the record that indicates that the test case is linked to the software feature, updating the representation of the test case to reflect the software feature specification as updated.

Such embodiments may yet further include: (i) obtaining a second text-based description of a second software feature of the software application; (ii) parsing the second text-based description into a second software feature specification in the machine-executable format; and (iii) storing a representation of the second software feature specification in a record that indicates that the test case is linked to the second software feature. Such embodiments may additionally include: (i) during testing of the software application, determining that the test case is linked to the software feature and the second software feature; and (ii) executing the test case on the software feature and on the second software feature as implemented in the software application to determine whether the software feature has been implemented or has been improperly implemented and to determine whether the second software feature has been implemented or has been improperly implemented. Additionally or alternatively, such embodiments may additionally include: (i) based on the second software feature specification, generating a second test case, wherein the second test case represents a machine-executable description of a test to evaluate whether the second software feature has been implemented or has been improperly implemented; (ii) determining that a level of similarity between the test case and the second test case exceeds a threshold level of similarity; and (iii) responsive to determining that the level of similarity between the test case and the second test case exceeds the threshold level of similarity, deleting the second test case, wherein storing the representation of the second software feature specification in the record that indicates that the test case is linked to the second software feature is performed responsive to determining that the level of similarity between the test case and the second test case exceeds the threshold level of similarity.

The embodiments of FIG. 11 may additionally include: (i) obtaining a second text-based description of a second software feature of the software application; (ii) parsing the second text-based description into a second software feature specification in the machine-executable format; and (iii) storing a representation of the second software feature specification in a record that indicates that the test case is linked to the second software feature. Such embodiments may yet further include: (i) during testing of the software application, determining that the test case is linked to the software feature and the second software feature; and (ii) executing the test case on the software feature and on the second software feature as implemented in the software application to determine whether the software feature has been implemented or has been improperly implemented and to determine whether the second software feature has been implemented or has been improperly implemented. Additionally or alternatively, such embodiments may additionally include: (i) based on the second software feature specification, generating a second test case, wherein the second test case represents a machine-executable description of a test to evaluate whether the second software feature has been implemented or has been improperly implemented; (ii) determining that a level of similarity between the test case and the second test case exceeds a threshold level of similarity; and (iii) responsive to determining that the level of similarity between the test case and the second test case exceeds the threshold level of similarity, deleting the second test case, wherein storing the representation of the second software feature specification in the record that indicates that the test case is linked to the second software feature is performed responsive to determining that the level of similarity between the test case and the second test case exceeds the threshold level of similarity.

The embodiments of FIG. 11 may additionally include: (i) obtaining a second text-based description of a second software feature of the software application; (ii) parsing the second text-based description into a second software feature specification in the machine-executable format; (iii) based on the second software feature specification, generating a second test case, wherein the second test case represents a machine-executable description of a test to evaluate whether the second software feature has been implemented or has been improperly implemented; (iv) determining that a level of similarity between the test case and the second test case exceeds a threshold level of similarity; and (v) responsive to determining that the level of similarity between the test case and the second test case exceeds the threshold level of similarity: (a) storing a representation of the second software feature specification and a representation of the second test case in a record that indicates that the second test case is linked to the second software feature, and (b) deleting the representation of the software feature specification and the representation of the test case.

The embodiments of FIG. 11 may additionally include: (i) obtaining a second text-based description of a second software feature of the software application; (ii) parsing the second text-based description into a second software feature specification in the machine-executable format; (iii) based on the second software feature specification, generating a second test case, wherein the second test case represents a machine-executable description of a test to evaluate whether the second software feature has been implemented or has been improperly implemented; (iv) determining that a level of similarity between the test case and the second test case exceeds a threshold level of similarity; (v) responsive to determining that the level of similarity between the test case and the second test case exceeds the threshold level of similarity, providing, via a user interface, an indication of the software feature specification, an indication of the test case, an indication of the second software feature specification, and an indication of the second test case; (vi) receiving, via the user interface, a command; and (vii) responsive to the command, performing one of: (a) storing a representation of the second software feature specification in a record that indicates that the test case is linked to the second software feature; (b) deleting the second software feature specification and the second test case; or (c) storing a representation of the second software feature specification and a representation of the second test case in a record that indicates that the second test case is linked to the second software feature, and deleting the representation of the software feature specification and the representation of the test case.

The embodiments of FIG. 11 may additionally include: (i) obtaining a second text-based description of a second software feature of the software application; (ii) parsing the second text-based description into a second software feature specification in the machine-executable format; (iii) based on the second software feature specification, generating a second test case, wherein the second test case represents a machine-executable description of a test to evaluate whether the second software feature has been implemented or has been improperly implemented; (iv) storing a representation of the second software feature specification and a representation of the second test case in a record that indicates that the second test case is linked to the second software feature; (v) obtaining an update to the text-based description of the software application; (vi) parsing the update to the text-based description of the software application to update the software feature specification; (vii) based on the software feature specification as updated and the record that indicates that the test case is linked to the software feature, generating an updated test case and updating the representation of the test case to reflect the updated test case; (viii) determining that a level of similarity between the updated test case and the second test case exceeds a threshold level of similarity; (ix) responsive to determining that the level of similarity between the updated test case and the second test case exceeds the threshold level of similarity, performing one of: (a) deleting the representation of the second test case and updating the record that indicates that the second test case is linked to the second software feature to indicate that the updated test case is linked to the second software feature; (b) deleting the representation of the second software feature specification and the representation of the second test case; or (c) deleting the representation of the software feature specification and the representation of the test case.

Such embodiments may additionally include: (i) responsive to determining that the level of similarity between the updated test case and the second test case exceeds the threshold level of similarity, providing, via a user interface, an indication of the software feature specification as updated, an indication of the updated test case, an indication of the second software feature specification, and an indication of the second test case; and (ii) receiving, via the user interface, a command to perform one of: (a) deleting the representation of the second test case and updating the record that indicates that the second test case is linked to the second software feature to indicate that the updated test case is linked to the second software feature; (b) deleting the representation of the second software feature specification and the representation of the second test case; or (c) deleting the representation of the software feature specification and the representation of the test case.

The embodiments of FIG. 11 may additionally include: (i) providing, via a user interface, an indication of the software feature specification and an indication of the test case; and (ii) receiving, via the user interface, a user input, wherein storing the representation of the software feature specification and the representation of the test case in a record that indicates that the test case is linked to the software feature is performed responsive to the user input. In such embodiments, (i) the user input may include at least one of a modification to the software feature specification or a modification to the test case, and (ii) storing the representation of the software feature specification and the representation of the test case in the record that indicates that the test case is linked to the software feature may include at least one of storing a representation of the software feature specification as modified or storing a representation of the test case as modified.

VIII. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising:
obtaining a text-based description of a software feature of a software application;
parsing the text-based description into a software feature specification in a machine-executable format;
based on the software feature specification, generating a test case, wherein the test case represents a machine-executable description of a test to evaluate whether the software feature has been implemented or has been improperly implemented;
storing a representation of the software feature specification and a representation of the test case in a record that indicates that the test case is linked to the software feature;
during testing of the software application, determining that the test case is linked to the software feature;
executing the test case on the software feature as implemented in the software application to determine whether the software feature has been implemented or has been improperly implemented;
obtaining a second text-based description of a second software feature of the software application;
parsing the second text-based description into a second software feature specification in the machine-executable format;
based on the second software feature specification, generating a second test case;
determining that a level of similarity between the test case and the second test case exceeds a threshold level of similarity; and
responsive to determining that the level of similarity between the test case and the second test case exceeds the threshold level of similarity, performing one of:
updating a record to indicate that the test case is linked to the second software feature; or
updating the record that indicates that the test case is linked to the software feature to indicate that the second test case is linked to the software feature.

2. The method of claim 1, wherein parsing the text-based description into the software feature specification in the machine-executable format comprises:
extracting a context for the software feature from the text-based description;
extracting at least one actor for the software feature from the text-based description;
segmenting the text-based description into two or more text segments;
generating at least one action for the software feature specification based on a corresponding at least one text segment of the two or more text segments, wherein the at least one action includes at least one object selected from an enumerated set of objects that is associated with the context; and generating at least one result for the software feature specification based on a corresponding at least one text segment of the two or more text segments, wherein the at least one result includes at least one object selected from the enumerated set of objects that is associated with the context.

3. The method of claim 2, wherein generating the test case based on the software feature specification comprises:

generating a first task to be performed by the at least one actor to enter the context;

based on the at least one action, generating at least one additional task to be performed by the at least one actor within the context; and based on the at least one result, generating at least one outcome that can be detected as a result of performance of the at least one additional task.

4. The method of claim 1, further comprising:

obtaining an update to the text-based description of the software application;

parsing the update to the text-based description of the software application to update the software feature specification; and based on the software feature specification as updated and the record that indicates that the test case is linked to the software feature, updating the representation of the test case to reflect the software feature specification as updated.

5. The method of claim 4, further comprising:

obtaining a third text-based description of a third software feature of the software application;

parsing the third text-based description into a third software feature specification in the machine-executable format; and storing a representation of the third software feature specification in a third record that indicates that the test case is linked to the third software feature.

6. The method of claim 5, further comprising:

during testing of the software application, determining that the test case is linked to the software feature and the third software feature; and executing the test case on the software feature and on the third software feature as implemented in the software application to determine whether the software feature has been implemented or has been improperly implemented and to determine whether the third software feature has been implemented or has been improperly implemented.

7. The method of claim 5, further comprising:

based on the third software feature specification, generating a third test case, wherein the third test case represents a third machine-executable description of a third test to evaluate whether the second software feature has been implemented or has been improperly implemented;

determining that a level of similarity between the test case and the third test case exceeds a threshold level of similarity; and responsive to determining that the level of similarity between the test case and the third test case exceeds the threshold level of similarity, deleting the third test case, wherein storing the representation of the third software feature specification in the record that indicates that the test case is linked to the third software feature is performed responsive to determining that the level of similarity between the test case and the third test case exceeds the threshold level of similarity.

8. The method of claim 1, further comprising:

during testing of the software application, determining that the test case is linked to the software feature and the second software feature; and executing the test case on the software feature and on the second software feature as implemented in the software application to determine whether the software feature has been implemented or has been improperly implemented and to determine whether the second software feature has been implemented or has been improperly implemented.

9. The method of claim 1, wherein the second test case represents a second machine-executable description of a second test to evaluate whether the second software feature has been implemented or has been improperly implemented, wherein the method further comprises, responsive to determining that the level of similarity between the test case and the second test case exceeds the threshold level of similarity, updating the record to indicate that the test case is linked to the second software features and deleting the second test case.

10. The method of claim 1, wherein obtaining the text-based description of the software feature comprises:

providing, via a user interface, a textual input field;

receiving, via the textual input field, textual input representative of a first context of an enumerated set of contexts;

receiving, via the textual input field, additional textual input that includes an escape symbol;

responsive to receiving the additional textual input that includes the escape symbol, providing, via the user interface, a menu of object names, wherein each object name in the menu of object names is associated with the first context;

receiving, via the user interface, a user selection of one of the object names in the menu; and responsive to receiving the user selection, adding the object name as selected to the textual input field.

11. The method of claim 1, further comprising:

obtaining a third text-based description of a third software feature of the software application;

parsing the third text-based description into a third software feature specification in the machine-executable format;

based on the third software feature specification, generating a third test case, wherein the third test case represents a third machine-executable description of a third test to evaluate whether the third software feature has been implemented or has been improperly implemented;

determining that a level of similarity between the test case and the third test case exceeds a threshold level of similarity; and responsive to determining that the level of similarity between the test case and the third test case exceeds the threshold level of similarity:

storing a representation of the third software feature specification and a representation of the third test case in a second record that indicates that the second test case is linked to the second software feature, and deleting the representation of the software feature specification and the representation of the test case.

12. The method of claim 1, further comprising:

obtaining a third text-based description of a third software feature of the software application;

parsing the third text-based description into a third software feature specification in the machine-executable format;

based on the third software feature specification, generating a third test case, wherein the third test case represents a third machine-executable description of a third test to evaluate whether the third software feature has been implemented or has been improperly implemented;

determining that a level of similarity between the test case and the third test case exceeds a threshold level of similarity;

responsive to determining that the level of similarity between the test case and the third test case exceeds the threshold level of similarity, providing, via a user interface, an indication of the software feature specification, an indication of the test case, an indication of the third software feature specification, and an indication of the third test case;

receiving, via the user interface, a command; and responsive to the command, performing one of:

storing a representation of the third software feature specification in a third record that indicates that the test case is linked to the third software feature;

deleting the third software feature specification and the third test case; or storing a representation of the third software feature specification and a representation of the third test case in a fourth record that indicates that the third test case is linked to the third software feature, and deleting the representation of the software feature specification and the representation of the test case.

13. The method of claim 1, further comprising:

obtaining a third text-based description of a third software feature of the software application;

parsing the third text-based description into a third software feature specification in the machine-executable format;

based on the third software feature specification, generating a third test case, wherein the third test case represents a third machine-executable description of a third test to evaluate whether the third software feature has been implemented or has been improperly implemented;

storing a representation of the third software feature specification and a representation of the third test case in a third record that indicates that the third test case is linked to the second software feature;

obtaining an update to the text-based description of the software application;

parsing the update to the text-based description of the software application to update the software feature specification;

based on the software feature specification as updated and the record that indicates that the test case is linked to the software feature, generating an updated test case and updating the representation of the test case to reflect the updated test case;

determining that a level of similarity between the updated test case and the third test case exceeds a threshold level of similarity;

responsive to determining that the level of similarity between the updated test case and the third test case exceeds the threshold level of similarity, performing one of:

deleting the representation of the third test case and updating the record that indicates that the third test case is linked to the second software feature to indicate that the updated test case is linked to the third software feature;

deleting the representation of the third software feature specification and the representation of the third test case; or deleting the representation of the software feature specification and the representation of the test case.

14. The method of claim 13, further comprising:

responsive to determining that the level of similarity between the updated test case and the third test case exceeds the threshold level of similarity, providing, via a user interface, an indication of the software feature specification as updated, an indication of the updated test case, an indication of the third software feature specification, and an indication of the third test case; and receiving, via the user interface, a command to perform one of:

deleting the representation of the third test case and updating the record that indicates that the third test case is linked to the third software feature to indicate that the updated test case is linked to the third software feature;

deleting the representation of the third software feature specification and the representation of the third test case; or deleting the representation of the software feature specification and the representation of the test case.

15. The method of claim 1, further comprising:

providing, via a user interface, an indication of the software feature specification and an indication of the test case; and receiving, via the user interface, a user input, wherein storing the representation of the software feature specification and the representation of the test case in a record that indicates that the test case is linked to the software feature is performed responsive to the user input.

16. The method of claim 15, wherein the user input comprises at least one of a modification to the software feature specification or a modification to the test case, and wherein storing the representation of the software feature specification and the representation of the test case in the record that indicates that the test case is linked to the software feature comprises at least one of storing a representation of the software feature specification as modified or storing a representation of the test case as modified.

17. A non-transitory computer-readable medium, having stored thereon program instructions that, upon execution by a computing system, cause the computing system to perform operations comprising:

obtaining a text-based description of a software feature of a software application;

parsing the text-based description into a software feature specification in a machine-executable format;

based on the software feature specification, generating a test case, wherein the test case represents a machine-executable description of a test to evaluate whether the software feature has been implemented or has been improperly implemented;

storing a representation of the software feature specification and a representation of the test case in a record that indicates that the test case is linked to the software feature, during testing of the software application, determining that the test case is linked to the software feature;

executing the test case on the software feature as implemented in the software application to determine whether the software feature has been implemented or has been improperly implemented;

obtaining a second text-based description of a second software feature of the software application;

parsing the second text-based description into a second software feature specification in the machine-executable format;

based on the second software feature specification, generating a second test case;

determining that a level of similarity between the test case and the second test case exceeds a threshold level of similarity; and responsive to determining that the level of similarity between the test case and the second test case exceeds the threshold level of similarity, performing one of:

updating a record to indicate that the test case is linked to the second software feature; or updating the record that indicates that the test case is linked to the software feature to indicate that the second test case is linked to the software feature.

18. A system comprising:

one or more processors; and memory, containing program instructions that, upon execution by the one or more processors, cause the system to perform operations comprising:

obtaining a text-based description of a software feature of a software application;

parsing the text-based description into a software feature specification in a machine-executable format;

based on the software feature specification, generating a test case, wherein the test case represents a machine-executable description of a test to evaluate whether the software feature has been implemented or has been improperly implemented;

storing a representation of the software feature specification and a representation of the test case in a record that indicates that the test case is linked to the software feature, during testing of the software application, determining that the test case is linked to the software feature;

executing the test case on the software feature as implemented in the software application to determine whether the software feature has been implemented or has been improperly implemented;

obtaining a second text-based description of a second software feature of the software application;

parsing the second text-based description into a second software feature specification in the machine-executable format;

based on the second software feature specification, generating a second test case;

determining that a level of similarity between the test case and the second test case exceeds a threshold level of similarity; and responsive to determining that the level of similarity between the test case and the second test case exceeds the threshold level of similarity, performing one of:

updating a record to indicate that the test case is linked to the second software feature; or updating the record that indicates that the test case is linked to the software feature to indicate that the second test case is linked to the software feature.

* * * * *